(12) United States Patent
Guo

(10) Patent No.: US 12,481,931 B2
(45) Date of Patent: Nov. 25, 2025

(54) CAR-HAILING METHOD AND DEVICE, AS WELL AS COMPUTER READABLE STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventor: Yangchen Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 426 days.

(21) Appl. No.: 17/559,698

(22) Filed: Dec. 22, 2021

(65) Prior Publication Data

US 2022/0114504 A1    Apr. 14, 2022

Related U.S. Application Data

(63) Continuation of application No. 16/473,275, filed as application No. PCT/CN2018/121055 on Dec. 14, 2018, now abandoned.

(30) Foreign Application Priority Data

May 11, 2018  (CN) .......................... 201810449117.6

(51) Int. Cl.
*G06Q 10/02* (2012.01)
*G06Q 50/40* (2024.01)
*H04W 4/02* (2018.01)

(52) U.S. Cl.
CPC ............. *G06Q 10/02* (2013.01); *G06Q 50/40* (2024.01); *H04W 4/023* (2013.01); *H04W 4/025* (2013.01)

(58) Field of Classification Search
CPC ...... H04W 4/023; H04W 4/025; G06Q 50/40; G06Q 10/02
See application file for complete search history.

(56) References Cited

U.S. PATENT DOCUMENTS 11,024,304 B1 *   6/2021  Smith ..................... G10L 15/22
2009/0317066 A1  12/2009  Shibasaki
(Continued)

FOREIGN PATENT DOCUMENTS

CN       101540033 A       9/2009
CN       102479431 A       5/2012
(Continued)

OTHER PUBLICATIONS

"American Foundation for the Blind", AFB.org, available at: https://www.afb.org/aw/17/11/15386, last accessed Jul. 22, 2025; (Year: 2016).*
(Continued)

*Primary Examiner* — Emmett K. Walsh
(74) *Attorney, Agent, or Firm* — Calfee, Halter & Griswold LLP

(57) ABSTRACT

A car-hailing method and device, as well as a computer readable storage medium. The method includes receiving a car-hailing instruction and sending a car-hailing notification to a second terminal associated with a first terminal so that the second terminal sends car-hailing information to a target object according to the car-hailing notification. The car-hailing information includes at least a geographical location of the first terminal, user information and a destination.

9 Claims, 2 Drawing Sheets

---

Receive a car-hailing instruction — 101

↓

Send a car-hailing notification to a second terminal associated with the first terminal so that the second terminal sends car-hailing information to a target object according to the car-hailing notification, the car-hailing information at least comprising a geographical location of the first terminal, user information of the first user and a destination — 102

(56) References Cited

U.S. PATENT DOCUMENTS

| | | |
|---|---|---|
| 2013/0159033 A1 | 6/2013 | Weinstock et al. |
| 2016/0012353 A1* | 1/2016 | Falkowska et al. |
| 2017/0169622 A1* | 6/2017 | Marueli ............... G06Q 10/02 |
| 2017/0220966 A1 | 8/2017 | Wang |
| 2017/0316696 A1 | 11/2017 | Bartel |
| 2018/0137593 A1 | 5/2018 | Djuric et al. |
| 2018/0143027 A1* | 5/2018 | Schlesinger ........... G06Q 50/40 |
| 2018/0211348 A1 | 7/2018 | Narayan et al. |
| 2019/0164247 A1* | 5/2019 | Frischmuth ........... H04W 4/024 |
| 2021/0334710 A1 | 10/2021 | Guo |

FOREIGN PATENT DOCUMENTS

| | | |
|---|---|---|
| CN | 104216972 A | 12/2014 |
| CN | 104794882 A | 7/2015 |
| CN | 204791523 U | 11/2015 |
| CN | 105812453 A | 7/2016 |
| CN | 106211056 A | 12/2016 |
| CN | 107808206 A | 3/2018 |
| CN | 108668222 A | 10/2018 |

OTHER PUBLICATIONS

First Office Action for Chinese Patent Application No. 201810449117.6 dated Sep. 27, 2019.
Search Report and Written Opinion for International Application No. PCT/CN2018/121055 dated Mar. 5, 2019.
Office action from U.S. Appl. No. 16/473,275 dated Oct. 16, 2023.
Article, "Lyft and Uber Have Changed the Transportation Game for People with Visual Impairments", Dated Nov. 2016, from Access World Home, 5 pgs.
Office action from U.S. Appl. No. 16/473,275 dated Aug. 26, 2022.
Office action from U.S. Appl. No. 16/473,275 dated Feb. 25, 2022.

* cited by examiner

CAR-HAILING METHOD AND DEVICE, AS WELL AS COMPUTER READABLE STORAGE MEDIUM

CROSS REFERENCE TO RELATED APPLICATION

The present application is a continuation application of U.S. application Ser. No. 16/473,275, filed on Jun. 25, 2019, which is a 371 of International Application No. PCT/CN2018/121055, filed on Dec. 14, 2018, which claims the benefit of Chinese Patent Application No. 201810449117.6, filed on May 11, 2018, the entire disclosures of which are incorporated herein by reference.

TECHNICAL FIELD

The present invention relates to the field of mobile terminal technology, and more particularly to a car-hailing method and device, as well as a computer readable storage medium.

BACKGROUND

With the development of mobile communication, online car-hailing products are becoming increasingly popular and widely used in people's daily lives.

SUMMARY

According to an exemplary embodiment, there is provided a car-hailing method. The car-hailing method is applied to a first terminal used by a first user, and may comprise: receiving a car-hailing instruction; and sending a car-hailing notification to a second terminal associated with the first terminal in accordance with the car-hailing instruction so that the second terminal sends car-hailing information to a target object according to the car-hailing notification. The car-hailing information comprises at least a geographical location of the first terminal, user information of the first user and a destination.

In some exemplary embodiments, the method may further comprise prompting vehicle-traveling information according to the user instruction of the first user. The vehicle-traveling information comprises at least one of: whether the destination has been reached, a current geographical location, a distance from the destination, estimated arrival time or road conditions ahead.

In some exemplary embodiments, before receiving a car-hailing instruction, the method may further comprise acquiring user information of the first user. The user information comprises at least user defect descriptive information, which comprises at least one of a visual defect, a hearing defect, a language communication defect or physical disability.

In some exemplary embodiments, before receiving a car-hailing instruction, the method may further comprise operating a car-hailing response functional key of the first terminal to trigger a corresponding function. The function comprises at least one of: one-key car hailing, join a call, voice broadcast, or contact a second user.

According to another exemplary embodiment, there is provided a car-hailing method. The car-hailing method is applied to a second terminal used by a second user, and may comprise: receiving a car-hailing notification sent by a first terminal; and sending car-hailing information to a target object according to the car-hailing notification. The car-hailing information comprises at least a geographical location of the first terminal, user information of a first user and a destination.

In some exemplary embodiments, after sending car-hailing information to a target object according to the car-hailing notification, the method may further comprise communicating with a third terminal of a vehicle providing passenger service and the first terminal. The communication comprises at least one of: talking, text information or image information.

In some exemplary embodiments, the method may further comprise prompting the vehicle-traveling information of the first terminal according to a user instruction of the second user. The vehicle-traveling information comprises at least one of: whether the destination has been reached, a current geographical location, a distance from the destination, estimated arrival time or road conditions ahead.

In some exemplary embodiments, the method may further comprise detecting whether the first terminal is located within a selected range of the destination; and in response to the fact that the first terminal is located within the selected range, sending, to the third terminal, confirmation information that the first terminal has arrived according to the user instruction of the second user.

According to another exemplary embodiment, there is provided a car-hailing device. The car-hailing device may comprise a memory configured to store computer instructions; and one or more processors configured to execute the computer instructions to perform the car-hailing method as stated above.

According to a yet another exemplary embodiment, there is provided a car-hailing device. The car-hailing device may comprise a car-hailing instruction receiver configured to receive a car-hailing instruction; and a car-hailing notification sender configured to send a car-hailing notification to a second terminal associated with the first terminal in accordance with the car-hailing instruction, so that the second terminal sends car-hailing information to a target object according to the car-hailing notification. The car-hailing information comprises at least a geographical location of the first terminal, user information of the first user and a destination.

In some exemplary embodiments, the device may further comprise: a first vehicle-traveling information prompter configured to prompt vehicle-traveling information according to a user instruction of the first user. The vehicle-traveling information comprises at least one of whether the destination has been reached, a current geographical location, a distance from the destination, estimated arrival time or road conditions ahead.

In some exemplary embodiments, the device may further comprise a user information acquirer configured to acquire the user information of the first user. The user information comprises at least user defect descriptive information, which comprises at least one of a visual defect, a hearing defect, a language communication defect or physical disability.

In some exemplary embodiments, the device may further comprise a car-hailing response functional key configured to be operable to trigger a corresponding function. The function comprises at least one of one-key car hailing, join a call, voice broadcast, or contact a second user.

According to a yet another exemplary embodiment, there is provided a car-hailing device. The car-hailing device may comprise a car-hailing notification receiver configured to receive a car-hailing notification sent by a first terminal; and a car-hailing information sender configured to send car-hailing information to a target object according to the car-hailing notification. The car-hailing information comprises at least a geographical location of the first terminal, user information of the first user and a destination.

In some exemplary embodiments, the device may further comprise a communicator configured to communicate with a third terminal of a vehicle providing passenger service and the first terminal. The communication comprises at least one of talking, text information or image information.

In some exemplary embodiments, the device may further comprise a second vehicle-traveling information prompter configured to prompt the vehicle-traveling information of the first terminal according to a user instruction of the second user. The vehicle-traveling information comprises at least one of whether the destination has been reached, a current geographical location, a distance from the destination, estimated arrival time or road conditions ahead.

In some exemplary embodiments, the device may further comprise a terminal position detector configured to detect whether the first terminal is located within a selected range of the destination; and a confirmation information sender configured to, in response to the fact that the first terminal is located within the selected range, send confirmation information that the first terminal has arrived to the third terminal according to the user instruction of the second user.

According to a yet another exemplary embodiment, there is provided a computer readable storage medium. The computer readable storage medium stores computer instructions. The computer instructions are executed in a processor so that the processor performs the car-hailing method as stated above.

DETAILED DESCRIPTION

Figure 1:
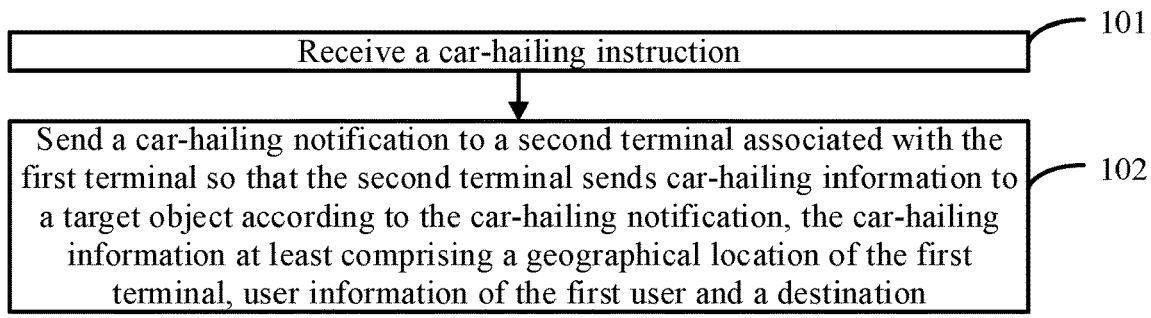
FIG. 1 shows a step flowchart of a car-hailing method according to an exemplary embodiment.

For the purpose of making the objects, features and advantages of the present disclosure clearer, the present disclosure will be further explained in detail with reference to the drawings and exemplary embodiments. In exemplary embodiments, a second user refers to a user who is associated with a first user at least in terms of a car-hailing behaviour.

In an exemplary embodiment, a second user may be a guardian or relative of a first user.

In another exemplary embodiment, a second user may be a customer service representative of a provider which provides a car-hailing service for a first user or a customer service representative selected by the first user.

In another exemplary embodiment, a second user may be a related person, such as a friend or a classmate, who helps and assists a first user with a car-hailing behaviour.

In another exemplary embodiment, a second user may also be a virtual assistant of a first user in a car-hailing behaviour, such as, without limitation, a Siri assistant of Apple mobile phones, a Bixby assistant of Samsung mobile phones, or a virtual customer service representative self-contained in car-hailing software.

In exemplary embodiments, according to the types of the first and second users, a first terminal and a second terminal may be different or identical terminals. For instance, if a second user is a virtual assistant of a first user in a car-hailing behaviour, such as a Siri assistant of Apple mobile phones, a Bixby assistant of Samsung mobile phones, or a virtual customer service representative of car-hailing software, the second terminal may be the same as the first terminal. For instance, if a second user is another person associated with the car-hailing behaviour of a first user, the second terminal may be different from the first terminal.

In exemplary embodiments, a vehicle providing passenger service may be the one directly accepting a car-hailing order issued by a requestor, or the one accepting a car-hailing order forwarded by a server according to the server's order allocation, or the one providing passenger service according to matchmaking transaction rules selected by both a requestor calling for a car-hailing service and a service provider providing passenger service.

In exemplary embodiments, the terminal may be any device having a data communication function, such as a functional mobile phone, a smart mobile phone, a tablet computer, a laptop, or a PDA. The terminal at least has a module with a data communication function, such as WWAN (comprising, but not limited to, GPRS, EGPRS, CDMA 1x, EVDO, EVDA, WCDMA, LTE, etc.), WLAN (comprising, but not limited to, Wi-Fi, WiMAX, etc.) or Bluetooth. Various instructions, data and information, etc. may be received and sent between terminals via the module with a communication function.

In exemplary embodiments, the module may be implemented by software executed by a processor, or by a circuit designed to have a corresponding module function. For instance, the relevant receiver or sender may receive or send instructions, data, information and the like between terminals by means of modules in the terminals that have data communication function. For instance, the geographical location, etc., of a terminal may be detected by GPS, A-GPS, Wi-Fi positioning or Bluetooth positioning, etc. The information prompter and the like may perform an information prompting function by means of a speaker, a display screen, a vibrating motor, etc. in a terminal. User information may be acquired when a user registers an account, and may be stored in a memory in a terminal and/or a server of a service provider providing a car-hailing service, and the like. Calls between terminals may be conducted via voice call that is based on a circuit switching (CS) domain, VOIP voice call that is based on a packet switching (PS) domain, VoLTE that is based on LTE, VoWiFi that is based on Wi-Fi, etc.

The inventors of the present disclosure realize that for achieving a car-hailing function, an on-line car-hailing product usually locates the initial position of a passenger with GPS, and then a destination is inputted manually by the passenger. Later, a driver of a hailed car contacts and communicates with the passenger so as to further determine the initial position or destination of the passenger by text or a phone call. This car-hailing manner is very inconvenient in operation and use for special groups of people, e.g., the elder or disabled having a visual, hearing or language impairment.

FIG. 1 shows a step flowchart of a car-hailing method according to an exemplary embodiment. The method may be applied to a first terminal used by a first user. The method may comprise a step 101 and a step 102.

In the step 101, a car-hailing instruction is received.

In the exemplary embodiment, the first terminal receives the car-hailing instruction that the first user needs to take a car. The specific receiving manner is set as appropriate.

In some exemplary embodiments, before receiving a car-hailing instruction, the method may further comprise acquiring user information of the first user. The user information may comprise at least user defect descriptive information. The user defect descriptive information may comprise at least one of a visual defect, a hearing defect, a language communication defect or physical disability.

In the exemplary embodiment, after car-hailing software runs, the first terminal may first acquire user information of the first user, and then set a manner of receiving the car-hailing instruction according to the user defect descriptive information in the user information. That is to say, a customized service may be provided for the first user according to the user defect descriptive information.

If the user defect descriptive information is a visual defect, a car-hailing instruction for receiving a voice input may be set.

If the user defect descriptive information is a hearing defect, a car-hailing instruction for receiving a textual input may be set.

In some exemplary embodiments, the user defect descriptive information may further comprise a description about the degree of a defect so that a car-hailing service provider gets ready for that. For instance, the user defect descriptive information may be physical disability and support-needed.

User information is not limited in detail in embodiments of the present disclosure, and may be set as appropriate. The manner of acquiring user information may be inputted into a first terminal by a second user associated with the first user, or inputted into car-hailing software by a second user.

In some exemplary embodiments, the first terminal has a car-hailing response functional key(s). The car-hailing response functional key(s) is configured to trigger a corresponding function(s) when being operated.

In some exemplary embodiments, the car-hailing response functional key(s) can be implemented by software. For instance, the first terminal displays a car-hailing interface, and displays the car-hailing response functional key(s) in at least a partial region of the car-hailing interface. The car-hailing response functional key(s) is configured to display and trigger a corresponding function(s), and the function(s) may comprise at least one of one-key car hailing, join a call, voice broadcast or contact a second user.

For instance, the car-hailing response functional key(s) may be configured to display and trigger a corresponding function(s).

In the exemplary embodiment, when the first terminal runs car-hailing software, the car-hailing interface may be displayed on a screen, and the car-hailing interface displays a car-hailing response functional key for one-key car hailing. When the first user taps the car-hailing response functional key, the first terminal receives a car-hailing instruction.

The car-hailing response functional key(s) may also be configured to present different functional interfaces on a screen according to different riding phases of the first user so as to facilitate triggering of a corresponding function by the first user. For instance, when the first user hails a car, the car-hailing response functional key on the car-hailing interface is presented as "one-key car hailing". After the second user receives a car-hailing notification, the car-hailing response functional key on the car-hailing interface is presented as "join a call". During the riding of the first user, the car-hailing response functional key on the car-hailing interface is presented as "voice broadcast". When the first user arrives at the destination, the car-hailing response functional key on the car-hailing interface is presented as "contact a second user".

The car-hailing response functional key(s) may also be simultaneously presented as multiple functions on the screen, but with only one of them highlighted. The car-hailing interface and the car-hailing response functional key(s) are not limited in detail in embodiments of the present disclosure and may be set as appropriate.

In some exemplary embodiments, the car-hailing response functional key(s) may be implemented by hardware. For instance, one or more keys may be arranged on a hardware structure of the first terminal, and may be programmed or fixedly defined to execute one or more functions associated with a car-hailing behaviour. For instance, the keys may be defined to implement one or more functions that correspond to the car-hailing response functional key(s) implemented with the above-mentioned software.

In the step 102, a car-hailing notification is sent to a second terminal associated with the first terminal so that the second terminal sends car-hailing information to a target object according to the car-hailing notification. The car-hailing information comprises at least a geographical location of the first terminal, user information of the first user and a destination.

In the exemplary embodiment, the first terminal used by the first user is associated with the second terminal used by the second user. When the first terminal receives a car-hailing instruction, it sends a car-hailing notification to the second terminal, which in turn sends car-hailing information to a target object upon receipt of the car-hailing notification. There may be a plurality of second terminals associated with the first terminal, and priorities may be set for the plurality of second terminals. The target object may be a server of car-hailing software, or a designated terminal, such as an on-line car-hailing order receiving driver fixedly allocated to the first user. This is not limited in detail in embodiments of the present disclosure and may be set as appropriate.

The car-hailing information may comprise at least the geographical location of the first terminal, user information of the first user and a destination, so that a vehicle providing passenger service may acquire a boarding position and gets ready for service. The car-hailing information may be preset in the second terminal, or may be temporarily inputted into the car-hailing software. For instance, a plurality of frequently used boarding positions, frequently used destinations and frequently used routes are preset into the first terminal. When the geographical position of the first terminal is one of the frequently used boarding positions and one of the frequently used routes is selected, the preset car-hailing information may be used. When the geographical position of the first terminal is not a frequently used boarding position and the destination is not a frequently used destination, car-hailing information being temporarily inputted may be used.

In some exemplary embodiments, vehicle-traveling information is prompted according to the user instruction of the first user. The vehicle-traveling information may comprise at least one of whether the destination has been reached, a current geographical location, a distance from the destination, estimated arrival time or road conditions ahead.

In the exemplary embodiment, the first terminal may prompt vehicle-traveling information according to the user instruction of the first user. For instance, the first terminal may provide the vehicle-traveling information using voice broadcast. For instance, when the first user taps voice broadcast among the car-hailing response functional keys, the first terminal provides a current geographical location, a distance from the destination, estimated arrival time, etc. using voice broadcast. The first terminal may display the vehicle-traveling information, such as a driving map, on a screen, too. The first terminal may also prompt the first user that the vehicle providing the riding service has arrived at the destination via vibration. The way to prompt vehicle-traveling information is not limited in detail in embodiments of the present disclosure, and may be set as appropriate.

The vehicle-traveling information comprises at least one of whether the destination has been reached, a current geographical location, a distance from the destination, estimated arrival time or road conditions ahead. For instance, if the vehicle providing passenger service does not reach the boarding position of the first user, the vehicle-traveling information may comprise the distance between the vehicle providing passenger service and the first user. For instance, in the driving process, the vehicle-traveling information may comprise at least one of a group consisting of a current geographical location of the vehicle providing passenger service, a distance from the destination, estimated arrival time, and road conditions ahead. For instance, while the vehicle arrives at the destination, the vehicle-traveling information may comprise the information that the destination has been reached. The vehicle-traveling information is not limited in detail in embodiments of the present disclosure, and may be set as appropriate.

To sum up, in exemplary embodiments of the present disclosure, a first terminal used by a first user receives a car-hailing instruction, and sends a car-hailing notification to a second terminal associated with the first terminal so that the second terminal sends car-hailing information to a target object according to the car-hailing notification. The car-hailing information comprises at least a geographical location of the first terminal, user information of the first user and a destination. According to embodiments of the present disclosure, a car is hailed by a second terminal associated with the first terminal, which simplifies the first user's operation, and solves the problem that special groups of people, e.g., the elder or the disabled, cannot tell clearly the specific location or hail a car at all, etc.

In some exemplary embodiments, the user information of the first user may be acquired beforehand, and functionally customized service may be implemented according to the user information, which is more convenient for the first user to use.

Figure 2:
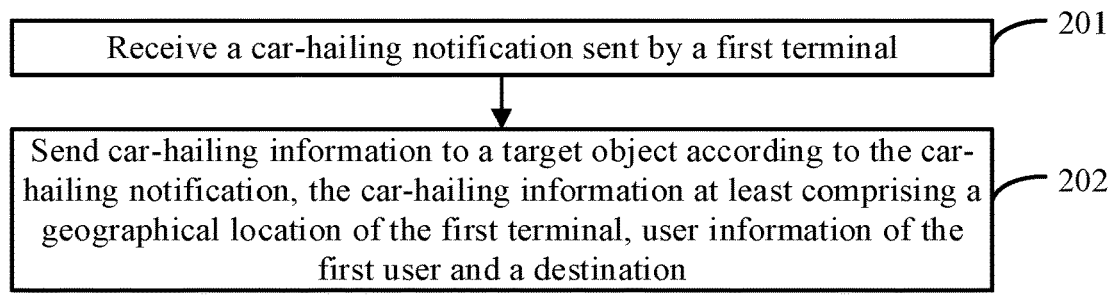
FIG. 2 shows a step flowchart of a car-hailing method according to an exemplary embodiment.

FIG. 2 shows a step flowchart of a car-hailing method according to an exemplary embodiment. The method may be applied to a second terminal used by a second user, and may comprise a step 201 and a step 202.

In the step 201, a car-hailing notification sent by a first terminal is received.

In the exemplary embodiment, the first user sends the car-hailing notification via the first terminal, and the second terminal used by the second user receives the car-hailing notification sent by the first terminal, thereby acquiring the information that the first user needs to take a car.

In the step 202, car-hailing information is sent to a target object according to the car-hailing notification, and the car-hailing information comprises at least a geographical location of the first terminal, user information of the first user and a destination.

In the exemplary embodiment, after receiving a car-hailing notification, a second terminal sends car-hailing information to a target object. The car-hailing information comprises a geographical location of a first terminal, user information of a first user and a destination. In this way, a vehicle that provides passenger service may learn the geographical location of the first user, user defect descriptive information, etc., and then get ready for the service beforehand. The car-hailing information may be pre-set in the second terminal beforehand, or may also be temporarily inputted by the second user.

In some exemplary embodiments, after sending car-hailing information to a target object according to the car-hailing notification, communication with a third terminal of the vehicle that provides passenger service and the first terminal is conducted. The communication comprises at least one of talking, text information or image information.

In some exemplary embodiments, after sending the car-hailing information, the second terminal may also communicate with the third terminal of the vehicle providing passenger service and the first terminal of the first user, such as establishing a multi-party call, or providing text information or image information to both the third terminal and the first terminal, so that the vehicle providing passenger service knows more about user information of the first user, such as appearance, clothing, specific location, so as to help the vehicle providing passenger service to locate the first user.

In some exemplary embodiments, vehicle-traveling information of the first terminal is prompted according to the user instruction of the second user. The vehicle-traveling information comprises at least one of whether the destination has been reached, a current geographical location, a distance from the destination, estimated arrival time or road conditions ahead.

In the exemplary present embodiment, after a vehicle is successfully hailed, the second terminal may, according to the user instruction of the second user, prompt the vehicle-traveling information of the first terminal, such as the current geographical location of the first user and the a distance from the destination, so that the second user keeps track of the route of the first user at any time, which provides safeguard for riding safety of the first user.

In some exemplary embodiments, it is detected whether the first terminal is located within a selected range of the destination. If the first terminal is located within the selected range, confirmation information that the first terminal has arrived is sent to the third terminal according to the user instruction of the second user.

For instance, the geographical location of the first terminal may be acquired in real time or at a certain time interval, so as to detect whether the first terminal is located within the selected range of the destination. When the first terminal enters into the selected range, the second terminal prompts the second user so that the second user confirms whether the first user has arrived. When the second user confirms that the first user has arrived at the destination, the second terminal may send the confirmation information that the first terminal has arrived to the third terminal according to the user instruction of the second user.

For instance, the selected range may be an area centred at the destination with a radius of 3, 5 or 10 meters, or an area in a map selected by the first user or second user. The selected range is not limited in detail in embodiments of the present disclosure, and may be set as appropriate.

In some exemplary embodiments, the second user may check the vehicle-traveling information of the first terminal by means of the second terminal at any time, which provides safeguard for riding safety of the first user.

To sum up, in some exemplary embodiments, a second terminal used by the second user receives a car-hailing notification sent by a first terminal, and sends car-hailing information to a target object according to the car-hailing notification. The car-hailing information comprises at least a geographical location of the first terminal, user information of a first user and a destination. Exemplary embodiments of the present disclosure allow hailing a car by the second terminal associated with the first terminal, which simplifies the first user's operation, and solves the problem that special groups of people, e.g., the elder or the disabled, cannot tell clearly the specific location or has no ability to hail a car at all, etc.

Figure 3:
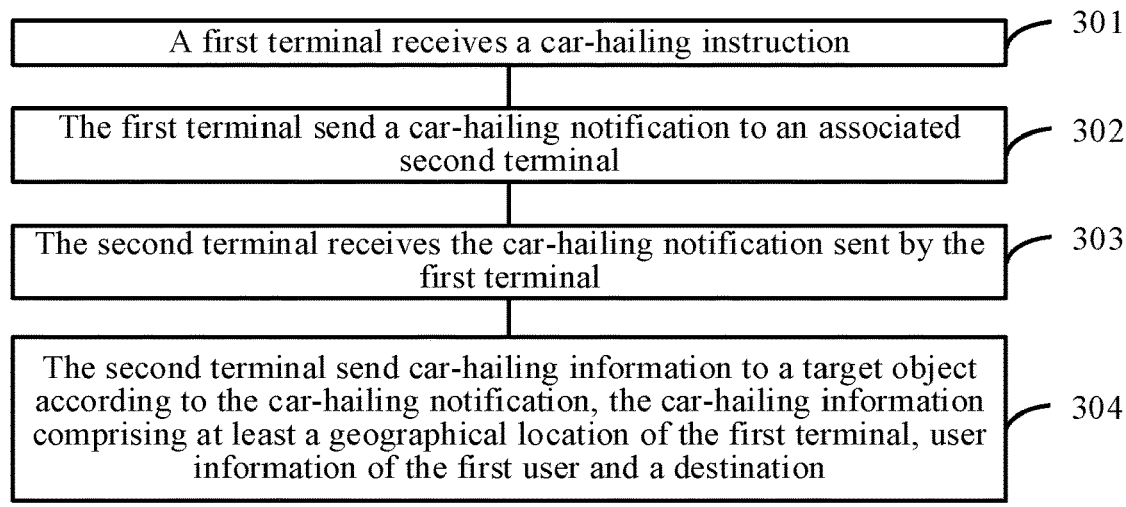
FIG. 3 shows a step flowchart of a car-hailing method according to an exemplary embodiment.

FIG. 3 shows a step flowchart of a car-hailing method according to an exemplary embodiment.

In the step 301, a car-hailing instruction is received by a first terminal.

In the step 302, the first terminal sends a car-hailing notification to an associated second terminal.

In the step 303, the second terminal receives the car-hailing notification sent by the first terminal.

In the step 304, the second terminal sends car-hailing information to a target object according to the car-hailing notification, and the car-hailing information comprises at least a geographical location of the first terminal, user information of the first user and a destination.

In the exemplary embodiment, a first terminal receives a car-hailing instruction and then sends a car-hailing notification to a second terminal associated with the first terminal. After receiving the car-hailing notification sent by the first terminal, the second terminal acquires the information that the first user using the first terminal needs to take a car. The second terminal sends car-hailing information to a target object, and the car-hailing information comprises a geographical location of the first terminal, user information of a first user and a destination, so that the vehicle providing passenger service may get ready for service according to the car-hailing information.

Exemplary embodiments allow hailing of a car by the second terminal associated with the first terminal, which simplifies the first user's operation, and solves the problem that special groups of people, e.g., the elder or the disabled, cannot tell clearly the specific location or has no ability to hail a car at all, etc.

Figure 4:
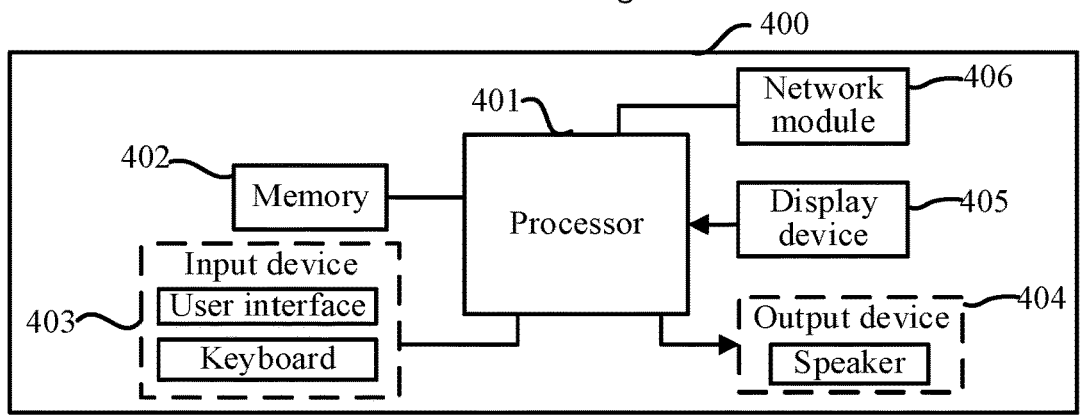
FIG. 4 shows a structural schematic view of a car-hailing device according to an exemplary embodiment.

FIG. 4 shows a car-hailing device 400 according to an exemplary embodiment. The car-hailing device 400 comprises one or more processors 401. The processor 401 is configured to execute computer instructions to perform one or more steps of the car-hailing methods shown in FIG. 1, 2 or 3.

The car-hailing device 400 further comprises a memory 402. The memory 402 may be connected with the processor 401 and configured to store the computer instructions.

The car-hailing device 400 may be implemented on a first terminal or a second terminal.

The car-hailing device 400 may be implemented as a computer product structure performing local computation, i.e., performing the car-hailing method described in above exemplary embodiments at a user side; or may be implemented as a computer product structure performing interaction between local and remote, i.e., performing some steps of the car-hailing method described in above exemplary embodiments on a terminal at user side and other steps of the car-hailing method described in the above exemplary embodiments at a network side with connection to the terminal at user side.

The processor 401 may be a logic operating device with data processing capability and/or program execution capability, such as a central processor unit (CPU), a field programmable logic array (FPLA), a microcontroller unit (MCU), a data signal processor (DSP) or an application specific integrated circuit (ASIC).

The memory 402 may be realized by any type of volatile or non-volatile memory device or the combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a CD.

The computer instructions comprise one or more processor operations defined by instruction set architecture corresponding to a processor, and these computer instructions may be logically comprised and represented by one or more computer programs.

The car-hailing device 400 may further comprise various input devices 403 (such as a user interface, and a keyboard), various output devices 404 (such as a speaker), a display device 405, etc. to implement interactions between a computer product and other product or users, which will not be reiterated herein.

The car-hailing device 400 may further comprise a network module 406. The network module 406 may be connected with other device by, e.g., a wireless network, a wired network, and/or any combination of a wireless network and a wired network. The network may comprise a local area network, the Internet, a telecommunication network, an Internet of Things based on the Internet and/or a telecommunication network, and/or any combination thereof. The wired network may communicate by way of, e.g., a twisted pair, a co-axial cable or an optical fibre. The wireless network may communicate by way of, e.g., a 3G/4G/5G mobile communication network, Bluetooth, Zigbee or Wi-Fi.

Figure 5:
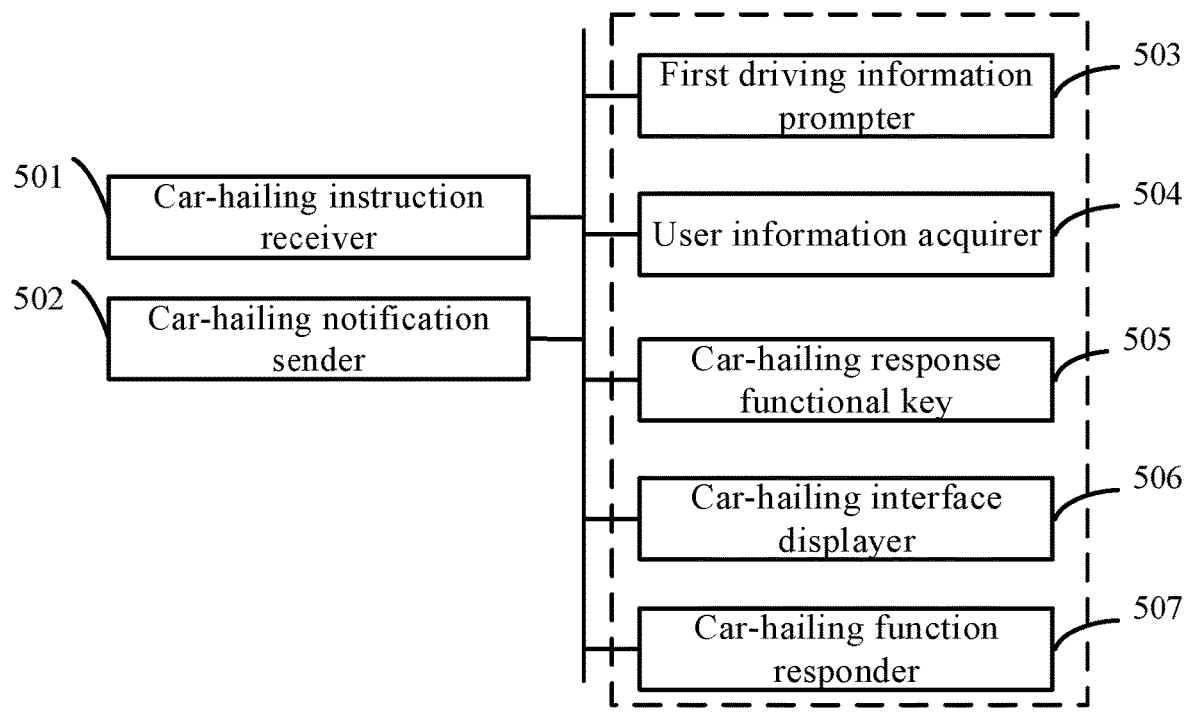
FIG. 5 shows a structural schematic view of a car-hailing device according to an exemplary embodiment.

FIG. 5 shows a car-hailing device according to an exemplary embodiment. The car-hailing device may be implemented on a first terminal used by a first user. The car-hailing device comprises:
  a car-hailing instruction receiver 501 configured to receive a car-hailing instruction;
  a car-hailing notification sender 502 configured to send a car-hailing notification to a second terminal associated with the first terminal, so that the second terminal sends car-hailing information to a target object according to the car-hailing notification. The car-hailing information comprises at least a geographical location of the first terminal, user information of the first user and a destination.

In some exemplary embodiments, the car-hailing device further comprises:
  a first vehicle-traveling information prompter 503 configured to prompt vehicle-traveling information according to the user instruction of the first user. The vehicle-traveling information comprises at least one of whether the destination has been reached, a current geographical location, a distance from the destination, estimated arrival time or road conditions ahead.

In some exemplary embodiments, the car-hailing device further comprises:
  a user information acquirer 504 configured to acquire the user information of the first user. The user information comprises at least user defect descriptive information which comprises at least one of a visual defect, a hearing defect, a language communication defect or physical disability.

In some exemplary embodiments, the car-hailing device may comprise a car-hailing response functional key 505.

The car-hailing response functional key 505 is configured to trigger a corresponding function when being operated.

In some exemplary embodiments, the car-hailing device may further comprise:

a car-hailing interface displayer 506 configured to display a car-hailing interface, and display the car-hailing response functional key in at least part of the car-hailing interface, wherein the car-hailing response functional key is configured to display and trigger a corresponding function according to the riding phase of the first user. The function comprises at least one of a group consisting of one-key car hailing, join a call, and voice broadcast.

In some exemplary embodiments, the first terminal may comprise one or more hardware keys that may be programmed or fixedly defined to execute one or more functions associated with a car-hailing behaviour to replace the car-hailing response functional key.

In some exemplary embodiments, the car-hailing device may further comprise:

a car-hailing function responder 507 configured to respond to a request generated by a first user and associated with a car-hailing behaviour.

To sum up, in exemplary embodiments, a first terminal used by a first user receives a car-hailing instruction, and sends a car-hailing notification to a second terminal associated with the first terminal so that the second terminal sends car-hailing information to a target object according to the car-hailing notification. The car-hailing information comprises at least a geographical location of the first terminal, user information of the first user and a destination. Exemplary embodiments allow hailing of a car via the second terminal associated with the first terminal, which simplifies the first user's operation, and solves the problem that special groups of people, e.g., the elder or the disabled, cannot tell clearly the specific location or has no ability to hail a car at all, etc.

In some exemplary embodiments, the user information of the first user may be acquired beforehand, and functionally customized service may be realized according to the user information, which is more convenient for the first user to use.

Figure 6:
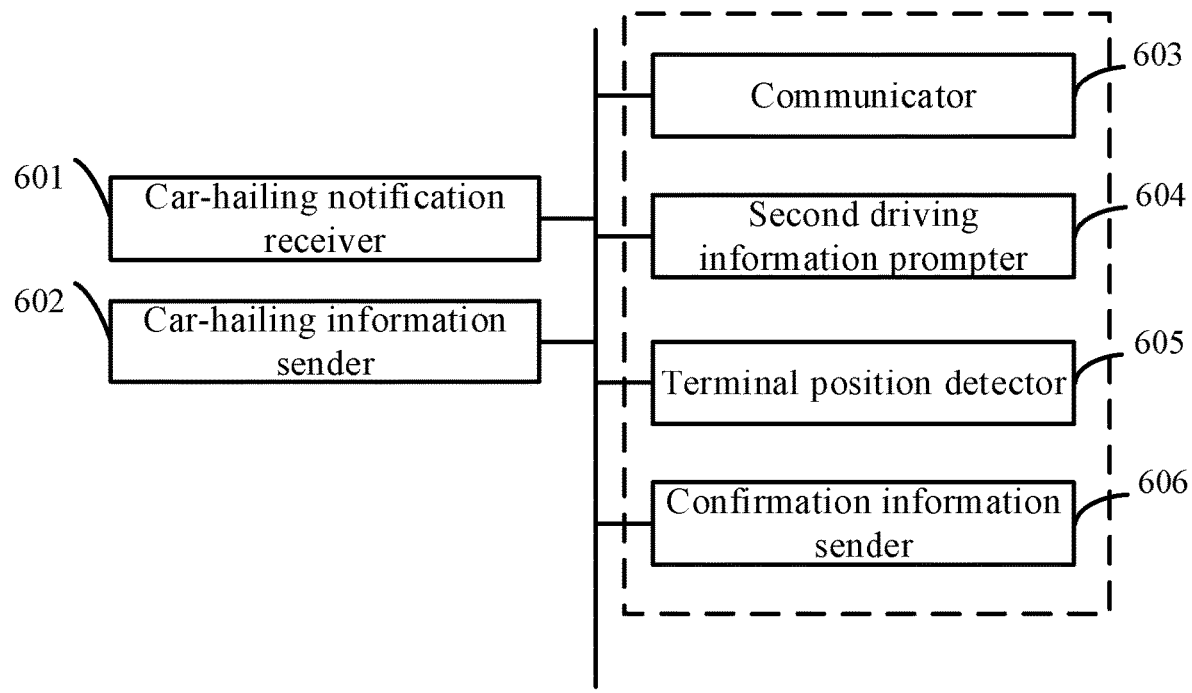
FIG. 6 shows a structural schematic view of a car-hailing device according to an exemplary embodiment.

FIG. 6 shows a car-hailing device according to an exemplary embodiment. The car-hailing device may be implemented on a second terminal used by a second user. The car-hailing device comprises:

a car-hailing notification receiver 601 configured to receive a car-hailing notification sent by a first terminal;

a car-hailing information sender 602 configured to send car-hailing information to a target object according to the car-hailing notification, the car-hailing information comprising at least a geographical location of the first terminal, user information of the first user and a destination.

In some exemplary embodiments, the device may further comprise:

a communicator 603 configured to communicate with a third terminal of a vehicle providing passenger service and the first terminal. The communication comprises at least one of talking, text information or image information.

In some exemplary embodiments, the device may further comprise:

a second vehicle-traveling information prompter 604 configured to prompt the vehicle-traveling information of the first terminal according to the user instruction of the second user.

The vehicle-traveling information comprises at least one of whether the destination has been reached, a current geographical location, a distance from the destination, estimated arrival time or road conditions ahead.

In some exemplary embodiments, the car-hailing device may further comprise:

a terminal position detector 605 configured to detect whether the first terminal is located within a selected range of the destination.

In some exemplary embodiments, the car-hailing device may further comprise:

a confirmation information sender 606 configured to, if the first terminal is located within the selected range, send confirmation information that the first terminal has arrived to the third terminal according to the user instruction of the second user.

To sum up, in some exemplary embodiments, a second terminal used by a second user receives a car-hailing notification sent by a first terminal, and sends car-hailing information to a target object according to the car-hailing notification. The car-hailing information comprises at least a geographical location of the first terminal, user information of the first user and a destination. Some exemplary embodiments allow hails to a car by the second terminal associated with the first terminal, which simplifies the first user's operation, and solves the problem that special groups of people, e.g., the elder or the disabled, cannot tell clearly the specific location or has no ability to hail a car at all, etc.

In some exemplary embodiments, the second user may check the vehicle-traveling information of the first terminal using the second terminal at any time, which provides safeguard for riding safety of the first user.

Exemplary embodiments may also be implemented as a computer readable storage medium. The computer readable storage medium stores computer instructions. The computer instructions are executed in a processor so that the processor performs the method as stated above.

Some exemplary embodiments of the present description are described in a stepwise manner, the difference between each exemplary embodiment and other embodiments is highlighted and reference may be made to each other for identical or similar parts in the various exemplary embodiments.

Finally, it shall also be explained that, in the description, the relationship term, such as first or second, is only used to distinguish one entity or operation from another entity or operation, and does not necessarily require or imply any actual relationship or order between these entities or operations. Moreover, the term "comprise" or "include" or any other variant indicates a non-exclusive inclusion, so that a process, method, product or apparatus comprising a series of elements comprises not only those elements, but also other elements not explicitly listed, or also comprises intrinsic elements of such a process, method, product or apparatus. In the case of no more limitations, an element defined by the expression "comprising a(n) . . . " does not exclude that the process, method, product or apparatus comprising the element also has other identical elements.

A car-hailing method and device according to exemplary embodiments are described in detail above. The present description utilizes specific examples to explain the principle and implementation of the present disclosure, and the above examples are only explained to facilitate the understanding of the method and core concept of the present disclosure; and meanwhile, as far as those ordinarily skilled in the art are concerned, variations may be made to the embodiments and application scope within the spirit of the present disclosure. In summary, the contents of the description shall not be understood as limitations to the present disclosure.

What is claimed is:

1. A car-hailing method, being applied to a system comprising a first terminal used by a first user having a visual defect and a second terminal used by a second user, the method comprising:
   associating the first terminal with the second terminal,
   the first terminal receiving a car-hailing instruction from the first user once the first user operates the car-hailing response functional hardware key, wherein the first terminal comprises a car-hailing interface, the car-hailing interface comprises the car-hailing response functional hardware key configured to receive a car-hailing instruction in the form of voice input once being tapped and trigger a corresponding function once being operated,
   when the function of one-key car hailing is triggered, the first terminal sending a car-hailing notification to the second terminal associated with the first terminal, to trigger the second terminal to send a formal car-hailing information generated according to the car-hailing notification to a target object, wherein the car-hailing notification is not recognizable by the target object while the car-hailing information is recognizable by the target object,
   the second terminal communicating with a third terminal associated with a vehicle providing passenger service, the communicating comprising at least one of talking, text information or image information, and
   the second terminal sending, to the third terminal, confirmation information that the first terminal has arrived.

2. The method according to claim 1, wherein the function comprises at least one of a group consisting of one-key car hailing, joining a call, voice broadcast and contacting the second user.

3. The method according to claim 2, wherein the car-hailing response functional hardware key is configured to trigger a corresponding function according to the riding phase of the first user.

4. The method according to claim 1, wherein a plurality of frequently used destinations are preset into the first terminal, and the method further comprises:
   in response to determining that one of the plurality of frequently used destinations is selected, using preset car-hailing information, the car-hailing information comprising at least the geographical position and a destination of the first terminal.

5. The method according to claim 4, wherein the car-hailing information is preset in the second terminal, or is temporarily inputted.

6. The method according to claim 1, further comprising:
   the first terminal prompting vehicle-traveling information of the first terminal, the vehicle-traveling information comprising at least one of: whether a destination has been reached, a current geographical location, a distance from the destination, estimated arrival time or road conditions ahead.

7. The method according to claim 1 further comprising:
   the second terminal prompting the vehicle-traveling information of the first terminal.

8. A car-hailing system comprising a first terminal used by a first user having a visual defect and a second terminal used by a second user, each of the first terminal and the second terminal comprising:
   a memory configured to store computer instructions; and
   one or more processors configured to execute the computer instructions to cooperatively perform steps of a car-hailing method comprising:
   associating the first terminal with the second terminal,
   the first terminal receiving a car-hailing instruction from the first user once the first user operates the car-hailing response functional hardware key, wherein the first terminal comprises a car-hailing interface, the car-hailing interface comprises the car-hailing response functional hardware key configured to receive a car-hailing instruction in the form of voice input once being tapped and trigger a corresponding function once being operated,
   when the function of one-key car hailing is triggered, the first terminal sending a car-hailing notification to the second terminal associated with the first terminal, to trigger the second terminal to send a formal car-hailing information generated according to the car-hailing notification to a target object, wherein the car-hailing notification is not recognizable by the target object while the car-hailing information is recognizable by the target object,
   the second terminal communicating with a third terminal associated with a vehicle providing passenger service, the communicating comprising at least one of talking, text information or image information, and
   the second terminal sending, to the third terminal, confirmation information that the first terminal has arrived.

9. A non-transitory computer readable storage medium comprising computer instructions stored thereon, which, when executed on a processor, causes the processor performs steps of a car-hailing method comprising:
   associating a first terminal used by a first user having a visual defect with a second terminal used by a second user,
   the first terminal receiving a car-hailing instruction from the first user once the first user operates the car-hailing response functional hardware key, wherein the first terminal comprises a car-hailing interface, the car-hailing interface comprises the car-hailing response functional hardware key configured to receive a car-hailing instruction in the form of voice input once being tapped and trigger a corresponding function once being operated,
   when the function of one-key car hailing is triggered, the first terminal sending a car-hailing notification to the second terminal associated with the first terminal, to trigger the second terminal to send a formal car-hailing information generated according to the car-hailing notification to a target object, wherein the car-hailing notification is not recognizable by the target object while the car-hailing information is recognizable by the target object,
   the second terminal communicating with a third terminal associated with a vehicle providing passenger service, the communicating comprising at least one of talking, text information or image information, and
   the second terminal sending, to the third terminal, confirmation information that the first terminal has arrived.

* * * * *